UNITED STATES PATENT OFFICE.

DAVID J. OGILVY, OF CINCINNATI, OHIO.

ROSIN-OIL COMPOUND.

SPECIFICATION forming part of Letters Patent No. 374,370, dated December 6, 1887.

Application filed March 23, 1885. Serial No. 159,830. (Specimens.)

*To all whom it may concern:*

Be it known that I, DAVID J. OGILVY, a citizen of the United States, residing at Cincinnati, Ohio, have invented new and useful Improvements in the Manufacture of Rosin-Oil Compounds, of which the following is a specification.

My invention relates to the manufacture of rosin-oil compounds, to wit: a drier to be used in the manufacture of paints, printing-inks, varnishes, &c., in which rosin-oil may be employed as an economical substitute for linseed-oil.

In carrying out my invention on a commercial scale, I take rosin-oil in about the proportion of one hundred gallons, red lead (litharge or any easily-decomposed salt of lead) in about the proportion of one hundred pounds, and manganese binoxide or protoxide in about the proportion of fifty pounds, and heat and stir the same together in a suitable vessel until they are thoroughly combined. The mass is then allowed to partially or wholly cool, and is then dissolved and liquefied with benzine or turpentine, and is ready for use with paints, inks, &c., as an ordinary drier. The presence of the litharge, although preferable, is not essential, and may be omitted, increasing in such case the proportion of manganese correspondingly.

Any of the weak protosalts of manganese, especially those of the fatty acids, and, similarly, any weak protosalt of lead or the protoxide may be employed in lieu of the salts first named in preparing the drier.

The advantages of this combination, as compared with the ordinary use of linseed-oil under similar circumstances, are, first, its cheapness; second, that in the heating and combining operation there is very little frothing, such as accompanies the use of linseed-oil; and third, the greater affinity of the mixture for oxygen; hence its more valuable drying properties.

I do not limit myself to the exact proportions named, as the same results, differing only in degree, may be attained by other proportions; but the proportions given produce, as I believe, the best results.

I claim as my invention and desire to secure by Letters Patent of the United States—

1. A drier for paints, &c., consisting of rosin-oil combined with an oxide or other salt of manganese easily decomposable by heat, substantially as set forth.

2. A liquid drier for paints, &c., consisting of a compound of rosin-oil, an oxide or other salt of manganese easily decomposable by heat, and a solvent vehicle, substantially as set forth.

In testimony whereof I have hereunto set my hand in the presence of two subscribing witnesses.

DAVID J. OGILVY.

Witnesses:
L. M. HOSEA,
G. M. CASSATT.